US010075217B1

United States Patent
Sung et al.

(10) Patent No.: US 10,075,217 B1
(45) Date of Patent: Sep. 11, 2018

(54) WIRELESS USER EQUIPMENT RF RELAY MANAGEMENT

(71) Applicant: Sprint Spectrum LP, Overland Park, KS (US)

(72) Inventors: Sanghoon Sung, Ashburn, VA (US); Udit Thakore, Fairfax, VA (US); Pinal Tailor, Ashburn, VA (US); Yun Sung Kim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 172 days.

(21) Appl. No.: 14/970,875

(22) Filed: Dec. 16, 2015

(51) Int. Cl.
*H04B 7/00* (2006.01)
*H04B 7/026* (2017.01)
*H04B 7/155* (2006.01)
*H04W 88/04* (2009.01)

(52) U.S. Cl.
CPC ......... *H04B 7/026* (2013.01); *H04B 7/15507* (2013.01); *H04W 88/04* (2013.01)

(58) Field of Classification Search
CPC .. H04B 7/0456; H04B 7/0413; H04B 7/0626; H04B 7/0667; H04B 7/068
See application file for complete search history.

(56) References Cited

U.S. PATENT DOCUMENTS

| | | | | |
|---|---|---|---|---|
| 2010/0167743 | A1* | 7/2010 | Palanki | H04B 7/155 455/436 |
| 2012/0045986 | A1* | 2/2012 | Jitsukawa | H04B 7/15507 455/7 |
| 2012/0127888 | A1* | 5/2012 | Fujishima | H04W 72/085 370/252 |
| 2013/0016649 | A1* | 1/2013 | Damnjanovic | H04W 88/04 370/315 |
| 2014/0023008 | A1 | 1/2014 | Ahn et al. | |
| 2014/0329535 | A1* | 11/2014 | Sadiq | H04W 76/023 455/452.2 |
| 2014/0342747 | A1 | 11/2014 | Lee et al. | |
| 2016/0157254 | A1* | 6/2016 | Novlan | H04W 72/02 370/329 |
| 2017/0055282 | A1* | 2/2017 | Sadiq | H04W 74/004 |

* cited by examiner

*Primary Examiner* — Ian N Moore
*Assistant Examiner* — Ronald H Davis

(57) ABSTRACT

UEs capable of RF relay are enabled and disabled under certain conditions. The access node can control the on and off duration of the UE functioning as an RF relay. The access node may only enable RF relay when there is a need by another UE for the RF relay. The UEs selected to relay (or to not relay) may be selected based on their location (e.g., close to a UE that is experiencing poor signal strength). In an embodiment, the RF relay function of UEs are successively turned on by the access node. This causes these UEs to relay the access node's beacon signal. If, after a period of time, the wireless network performance is not improved, these UEs are commanded to disable their RF relays. If the wireless network performance is improved, the UE may be allowed to continue as an RF relay.

14 Claims, 9 Drawing Sheets

US 10,075,217 B1

WIRELESS USER EQUIPMENT RF RELAY MANAGEMENT

TECHNICAL BACKGROUND

Wireless communication networks are widely deployed to provide communication services to both fixed and mobile devices. These services can include voice, data, video, messaging, web browsing, etc. Wireless communication has certain advantages, such as mobility, over wired communications for accessing a network. Various wireless standards have been adopted or proposed for wireless networks. These standards include 802.11 (WiFi), 802.16 (WiMAX), TIA-856 (which is also known as Evolution-Data Optimized—EV-DO), and long term evolution (LTE). Additional standards such as the fifth generation communication system (5G) are also being pursued.

Because of transmit power regulations, interference, and/or radio wave propagation characteristics, a base station (a.k.a. access node) may be unable to provide some wireless devices (a.k.a., user equipment—UE) with coverage and/or a desired level of service (e.g., throughput, packet loss, etc.). One approach to improving coverage and/or service, particularly to user equipment near the edge of, or outside of, a base station's direct coverage area is to relay communication between the base station and a wireless device via another wireless device. Relaying by a wireless device may also be used in crowded areas to improve coverage and/or service. Relaying in an area where there is a high number of other wireless devices is used to increase the available throughput to the wireless devices being relayed. However, wireless devices that are relaying communication for other wireless devices can cause interference to other devices and/or other base stations.

OVERVIEW

In an embodiment, a method of operating a communication system, includes receiving an indicator of RF conditions that is associated with a first user equipment (UE) communicating with an access node. A first location indicator associated with the first UE is also received. A second location indicator associated with a second UE is also received. Based on the indicator of RF conditions, the first location indicator, and the second location indicator, it is determined whether the second UE is to RF relay for the access node.

In an embodiment, a method of operating a communication system includes generating a first indicator of air-interface conditions that is associated with a plurality of user equipment (UE) communicating via an access node. Based on the first indicator of air-interface conditions, a first UE is configured to RF relay for the access node and thereby relay repeating beacon transmissions from the access node. Based on a second indicator of air-interface conditions associated with the first UE's RF relay for the access node, the first UE is configured to not RF relay for the access node.

In an embodiment, a method of operating a communication system, includes selecting a first user equipment (UE) to RF relay for an access node. The first UE is also configured to RF relay for the access node and thereby relay repeating beacon transmissions from the access node. It is also determined whether a second UE has established a connection to the access node while the first UE is RF relaying for the access node. It is also determined whether the second UE established the connection to the access node as a result of the first UE RF relaying for the access node.

DETAILED DESCRIPTION

A wireless device (a.k.a. user equipment—UE) being serviced by an access node may be configured to relay communication between the access node and other wireless devices. However, if a UE is configured to RF relay, but is not actually functioning to aid the other devices, the RF relay functions provided by the UE may cause interference and/or reduce battery life without significant (or any) benefits.

In an embodiment, UEs capable of RF relay are enabled and disabled under certain conditions. This helps reduce interference. For example, the access node can control the on and off duration of the UE functioning as an RF relay. Thus, the access node may only enable RF relay when there is a need by another UE for the RF relay. In an embodiment, the UEs selected to relay (or to not relay) may be selected based on their location (e.g., close to a UE that is experiencing poor signal strength).

In an embodiment, the RF relay function of UEs are selectively turned on by the access node. This causes these UEs to relay the access node's beacon signal. If, after a period of time, the wireless network performance is not improved, these UEs are commanded to disable their RF relays. If the wireless network performance is improved, and that improvement can be attributed to the RF relay of a UE, that UE is allowed to continue as an RF relay (and those that appear not to contribute to improved network performance are disabled as RF relays). Thus, only UEs that appear to contribute to improved network performance are allowed to RF relay for extended periods of time.

Figure 1:
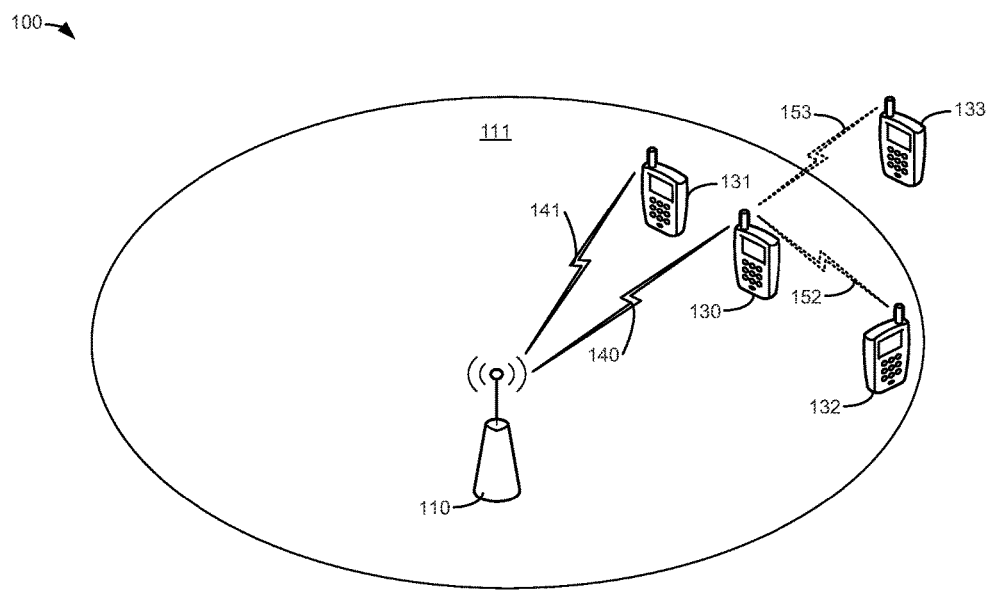
FIG. 1 is a block diagram illustrating a communication system.

FIG. 1 is a block diagram illustrating a communication system. In FIG. 1, communication system 100 comprises access node 110, wireless device 130, wireless device 131, wireless device 132, and wireless device 133. A wireless device 130-133 each may also be referred to as user equipment, or UE. Access node 110 is illustrated as having coverage area 111. Wireless device 130, wireless device 131, and wireless device 132 are located within coverage area 111. Wireless device 133 is located outside coverage area 111.

Access node 110 is illustrated as being operatively coupled to wireless device 130 via wireless link 140. Access node 110 is illustrated as being operatively coupled to wireless device 131 via wireless link 141. Thus, it should be understood that access node 110 has established direct (i.e., un-relayed) wireless links to wireless device 130 and wireless device 131. When a wireless device 130 in communication with access node 110 is acting as a relay, access node 110 may be referred to as a donor access node.

When RF relaying is enabled on wireless device 130, wireless device 130 can be operatively coupled to wireless device 132 via wireless link 152. Also when RF relaying is enabled on wireless device 130, wireless device 130 can be operatively coupled to wireless device 133 via wireless link 153. Thus, when RF relaying is enabled, wireless device 130 can function as a relay for communication between access node 110 and wireless device 132. Also when RF relaying is enabled, wireless device 130 can also function as a relay for communication between access node 110 and wireless device 133.

Access node 110 is a network node capable of providing wireless communication to wireless device 130, wireless device 131, wireless device 132, and/or wireless device 133. Access node 110 can be, for example, one or more of a base transceiver station, a radio base station, an eNodeB device, or an enhanced eNodeB device.

Communication system 100 is a communication network that can provide wireless communication to wireless device 130, wireless device 131, wireless device 132, and/or wireless device 133. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140, wireless link 141, wireless link 152, and/or wireless link 153 can be a radio frequency, microwave, or other similar signal. Wireless link 140, wireless link 141, wireless link 152, and/or wireless link 153 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from access node 110, wireless device 130, wireless device 131, wireless device 132, and/or wireless device 133, but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130, wireless device 131, wireless device 132, and/or wireless device 133 may be any device, system, combination of devices, or other such communication platform capable of communicating wirelessly with access node 110. Wireless device 130 may be any device, system, combination of devices, or other such communication platform capable of functioning as an RF relay with access node 110 functioning as a donor. Wireless device 132 and wireless device 133 may be any device, system, combination of devices, or other such communication platform capable of using wireless device 130 or wireless device 131 as an RF relay when access node 110 functioning as a donor access node.

Wireless device 130, wireless device 131, wireless device 132, and/or wireless device 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

In an embodiment, wireless device 130 and wireless device 131 can be configured to function as RF relays. In an embodiment, wireless device 130 and/or wireless device 131 can be configured to function as one or more of a layer 1 (L1), layer 2 (L2), or layer 3 (L3) relay. A layer 1 relay (i.e., RF relay) functions as a booster or repeater. In other words, a layer 1 relay device performs an amplify and forward (AF) function. RF signals received from access node 110 are amplified and transmitted by the relaying device (i.e., wireless device 130 and/or wireless device 131) to the device being relayed (i.e., wireless device 132 and/or wireless device 133). Likewise, RF signals received from the device(s) being relayed (i.e., wireless device 132 and/or wireless device 133) are amplified and transmitted by the relaying device (i.e., wireless device 130 and/or wireless device 131) to access node 110.

A layer 2 relay device performs a decode and forward (DF) function. RF signals received from access node 110 are demodulated and decoded, then encoded and modulated again before being transmitted by the relaying device (i.e., wireless device 130 and/or wireless device 131) to the device being relayed (i.e., wireless device 132 and/or wireless device 133). Likewise, RF signals received from the device(s) being relayed (i.e., wireless device 132 and/or wireless device 133) are demodulated and decoded, then encoded and modulated again before being transmitted by the relaying device (i.e., wireless device 130 and/or wireless device 131) to access node 110.

A layer 3 relay device also performs a decode and forward function. However, a layer 3 relay device also performs additional processing (such as ciphering and/or data concatenation/segmentation/reassembly) In other words, the relaying device (i.e., wireless device 130 and/or wireless device 131) performs demodulation and decoding of the received RF signals (either uplink or downlink), processes received data, then encodes, modulates, and transmits the data to the device(s) being relayed (i.e., wireless device 132 and/or wireless device 133 for the downlink, and access node 110 for the uplink).

In an embodiment, access node 110 controls the on and off duration of the RF relay functionality provided by wireless device 130. When access node 110 determines that at least one wireless device (e.g., wireless device 133 and/or wireless device 132) is in poor RF conditions, and also determines that another wireless device (e.g., wireless device 130) is located near to the wireless device 132-133 that is experiencing poor RF conditions, access node 110 configures wireless device 133 to act as an RF relay. Access node 110 can use channel quality indicator (CQI) reports, modulation and coding scheme (MCS), and/or hybrid automatic repeat request (HARQ) statistics/counts to determine when wireless device 132 and/or wireless device 133 is experiencing poor RF conditions (and thus, enable RF relay by another wireless device—e.g., wireless device 130.)

When access node 110 determines that there are no wireless devices 132-133 experiencing poor RF conditions, or determines that there are no wireless devices 130-131 located near to a wireless device 132-133 that is experiencing poor RF conditions, access node 110 configures wireless device 130 to disable functioning as an RF relay. Access node 110 can use CQI reports, MCS, and/or HARQ statistics/counts to determine when there are no wireless devices 132-133 experiencing poor RF conditions (and thus there is no need to enable RF relay by another wireless device—e.g., wireless device 130.)

In an embodiment, access node 110 receives one or more indicators of RF conditions associated with wireless device 133. These indicators can include, but are not limited to, CQI reports, MCS, and/or HARQ statistics/counts associated with wireless device 133. These indicators allow access node 110 to determine whether communication between access node 110 and wireless device 133 may benefit from RF relaying by wireless device 130 or wireless device 131. In other words, these indicators are used by access node 110 as a basis for determining whether wireless device 133 is experiencing poor RF conditions.

Access node 110 also receives (or determines) a first location associated with wireless device 133. Access node 110 also receives (or determines) a second location associated with wireless device 130. These locations are used by access node 110 as a basis for determining whether wireless device 133 could benefit from RF relaying by wireless device 130. In other words, if wireless device 130 is greater than a preselected distance from wireless device 133, enabling RF relaying by wireless device 130 is unlikely to improve the communication between wireless device 133 and access node 110.

If wireless device 130 is greater than a preselected distance from wireless device 133, access node 110 does not enable RF relaying by wireless device 130. If wireless device 130 is less than a preselected distance from wireless device 133, access node 110 configures wireless device 130 to RF relay.

In an embodiment, the distance between wireless device 130 and wireless device 133 may be expressed in terms of a linear distance. Thus, whether wireless device 133 could benefit from RF relaying by wireless device 130 can be determined in terms of the distance between wireless device 130 and wireless device 133 meeting (or not meeting) a threshold criteria (e.g., the number of meters between wireless device 130 and wireless device 133 being less than N meters—where N is a preselected number of meters.)

In an embodiment, the locations of wireless device 130 and wireless device 131 may be categorized into areas (e.g., grid-squares) and the distance between wireless device 130 and wireless device 133 may be expressed in terms of whether or not wireless device 130 and wireless device 131 are in the same area (e.g., both are located in the same grid-square.) Thus, whether wireless device 133 could benefit from RF relaying by wireless device 130 can be determined in terms of a threshold criteria that is based on whether or not wireless device 130 and wireless device 131 have been associated with the same area (e.g., grid-square) by access node 110.

After configuring wireless device 130 to function as an RF relay, when wireless device 130 and wireless device 133 move apart from each other (e.g., meet a second threshold criteria for the distance between wireless device 130 and wireless device 133), access node 110 reconfigures wireless device 130 to not function as an RF relay. In this manner, when the RF relay by wireless device 130 is no longer likely to be beneficial to communication between wireless device 133 and access node 110, the RF relay by wireless device 130 is stopped thereby eliminating interference caused by wireless device 130's RF relaying.

In an embodiment, access node 110 can generate a first indicator of wireless network conditions associated with wireless device 130-133. This first indicator of wireless network conditions may be based on, for example, an increase in: connection drop(s), connection establishment failure(s), connection reestablishment failure(s), handoff failures, and the like. Based on this first indicator of wireless network conditions, access node 110 configures wireless device 130 to RF relay. This causes wireless device 130 to relay the repeating beacon transmissions (also called discovery signals) coming from access node 110.

While wireless device 130 is relaying the repeating beacon transmissions coming from access node 110, access node 110 can generate a second indicator of wireless network conditions. This second indicator is associated with wireless device 130 relaying the repeating beacon transmissions coming from access node 110. Based on this second indictor of network conditions, access node 110 configures wireless device 130 to stop RF relaying and thereby no longer relay the repeating beacon transmissions from access node 110. In particular, if the second indicator does not show an improvement in the wireless networks conditions (which is likely to have been caused by configuring wireless device 130 to RF relay), then access node 110 turns off RF relaying by wireless device 130—thereby eliminating interference caused by wireless device 130's RF relaying.

In an embodiment, the second indictor of network conditions is based on at least one wireless device 132-133 establishing a communication link with access node 110. In an embodiment, the second indictor of network conditions is based on at least one wireless device 132-133 establishing a communication link with access node 110 via wireless device 130's RF relay.

In an embodiment, access node 110 can generate a first indicator of air-interface conditions associated with wireless devices 130-133 communicating via access node 110. This first indicator can be based on, but is not limited to, CQI reports, MCS, HARQ statistics/counts, connection drops, connection establishment, connection reestablishment, handoff success, etc. associated with one or more of wireless device 130-133 communicating with access node 110.

Based on this first indicator of air-interface conditions, wireless device 130 is configure to RF relay for access node 110. When a wireless device 130-133 is configured to RF relay for access node 110, the wireless device 130-133 will relay the repeating beacon transmissions from access node 110. After wireless device 130 relays RF signals for access node 110 for a period of time, access node 110 can generate a second indicator of air-interface conditions that is associated with wireless device 130 RF relaying for access node

110. This second indicator can be based on, but is not limited to, CQI reports, MCS, HARQ statistics/counts, connection drops, connection establishment, connection reestablishment, handoff success, etc. associated with one or more of wireless device 130-133 communicating with access node 110 while wireless device 130 is RF relaying for access node 110. In particular, this second indicator can indicate whether the air-interface conditions (e.g., CQI reports, MCS, HARQ statistics/counts, connection drops, connection establishment, connection reestablishment, handoff success, etc.) improved when wireless device 130 was RF relaying as compared to when wireless device 130 was not RF relaying.

Based on this second indicator, access node 110 may configure wireless device 130 to stop RF relaying. In particular, based on the second indicator corresponding to degraded (or at least not improved) air-interface conditions while wireless device 130 was RF relaying, access node 110 can determine that configuring wireless device 130 as an RF relay either does not improve the air-interface conditions, or degrades the air-interface conditions.

Also based on this second indicator, access node 110 may select another wireless device (e.g., wireless device 131) to be configured to RF relay for access node 110. In other words, if configuring wireless device 130 as an RF relay does not improve the air-interface conditions, access node 110 can successively select (one or more) wireless devices 130-133 to RF relay for access node 110. If configuring the selected wireless device 130-133 does not improve the air-interface conditions, then the wireless devices are stopped from RF relaying (at least for a while). If configuring a selected wireless device 130-133 (or plurality of wireless device) to RF relay for access node 110 improves air-interface conditions, then access node 110 may elect to have the selected wireless device(s) continue to RF relay for access node 110.

Access node 110 may also make the decision of whether to have a particular wireless device 130-133 (or group of wireless devices) continue to RF relay based on the location of the wireless device 130-133. This decision may be further based on the location of a wireless device 130-133 that establishes a connection to access node 110. In particular, the decision of whether to have a wireless device (e.g., wireless device 131) continue to RF relay may be further based on the location of a wireless device (e.g., wireless device 133) that establishes a connection to access node 110.

For example, if wireless device 133 establishes communication with access node 110 (an indicator of improved air-interface conditions) while wireless device 130 is RF relaying, access node 110 compares the locations (or location indicators) of wireless device 130 and wireless device 133. If the distance between wireless device 130 and wireless device 133 meets a threshold criteria (e.g., is less than a predetermined distance, or both devices are within the same area/grid-square), then access node 110 can conclude that the RF relay provided by wireless device 130 may have caused the improved air-interface conditions indicator. Based on the locations of the wireless device 130 configured to RF relay, and the wireless device 133 that establishes communication with access node 110, access node 110 can determine that wireless device 130 should continue to RF relay for access node 110.

In another example, if wireless device 133 establishes communication with access node 110 (an indicator of improved air-interface conditions) while wireless device 131 is RF relaying, access node 110 compares the locations (or location indicators) of wireless device 131 and wireless device 133. If the distance between wireless device 130 and wireless device 133 meets a threshold criteria (e.g., is greater than a predetermined distance, or both devices are not within the same area/grid-square), then access node 110 can conclude that the RF relay provided by wireless device 131 was not the cause of the improved air-interface conditions indicator. Therefore, based on the locations of the wireless device 131 configured to RF relay, and the wireless device 133 that establishes communication with access node 110, access node 110 can determine that wireless device 131 should not continue to RF relay for access node 110.

In an embodiment, access node 110 may select wireless device 130 to RF relay for access node 110. After selecting wireless device 130, access node 110 may configure wireless device 130 to RF relay thereby relaying the repeating beacon transmissions of access node 110.

While wireless device 130 is relaying for access node 110, wireless device 133 may establish a connection to access node 110. Access node 110 can determine whether the connection between access node 110 and wireless device 133 occurred during the time wireless device 130 was RF relaying for access node 110. Access node 110 can also determine whether the connection between access node 110 and wireless device 133 is as a result of wireless device 130 relaying for access node 110. In the event that wireless device 133 did not establish the connection to access node 110 as a result of the RF relay provided by wireless device 130, access node 110 configures wireless device 130 to not relay for access node 110 (and thereby not relay the repeating beacon transmissions from access node 110.)

To determine whether wireless device 133 established the connection to access node 110 as a result of the RF relay provided by wireless device 130, access node 110 may receive (or determine) location indicators associated with wireless device 130 and wireless device 133. Based on whether these location indicators meet a threshold criteria (e.g., a criteria related to the proximity of wireless device 130 to wireless device 133), access node 110 determines whether wireless device 133 established the connection to access node 110 as a result of the RF relay provided by wireless device 130. For example, if these location indicators correspond to wireless device 130 and wireless device 133 being in relatively close proximity to each other (e.g., within the same grid-square, or within a specified distance of each other), then access node 110 can determine that wireless device 133 established the connection to access node 110 as a result of the RF relay provided by wireless device 130. If these location indicators correspond to wireless device 130 and wireless device 133 being in relatively far apart from each other (e.g., not within the same grid-square, or not within a specified distance of each other), then access node 110 can determine that wireless device 133 did not establish the connection to access node 110 as a result of the RF relay provided by wireless device 130.

Figure 2A:
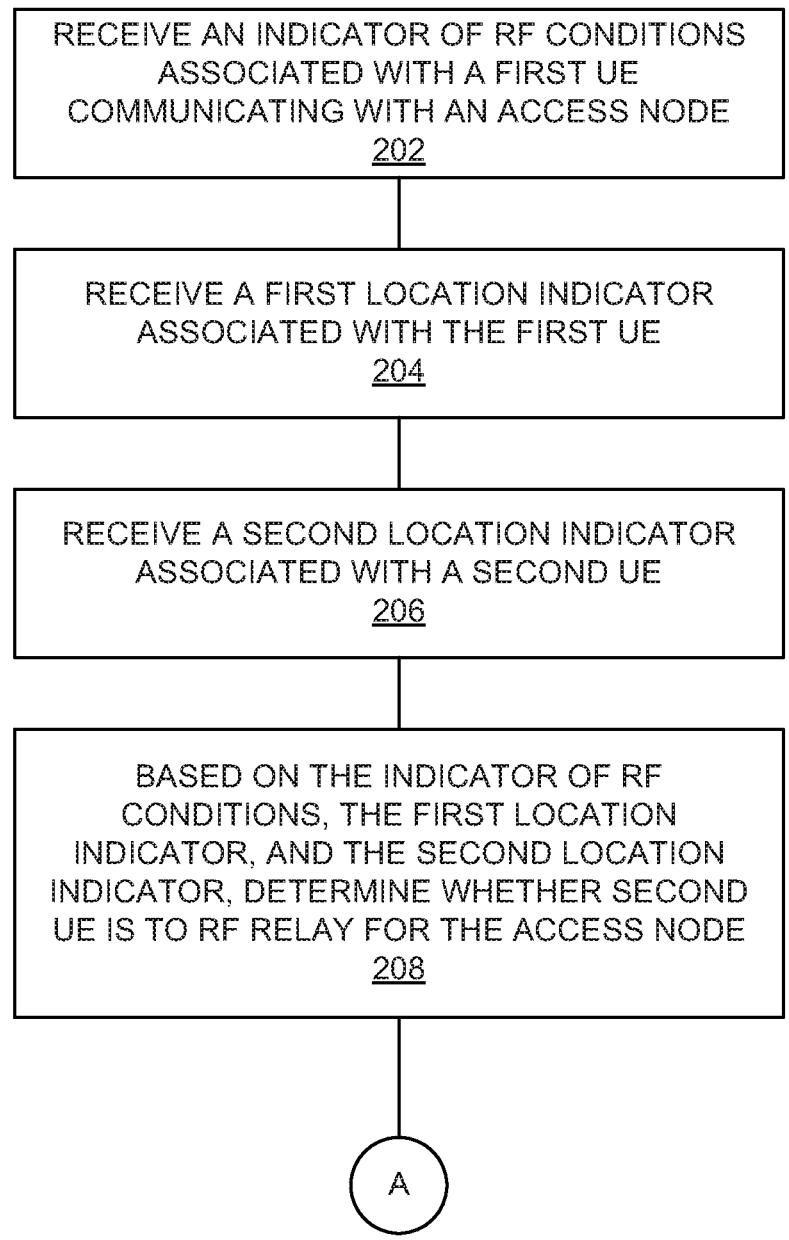
FIGS. 2A-2B are a flowchart illustrating a method of operating a communication system.
Figure 2B:
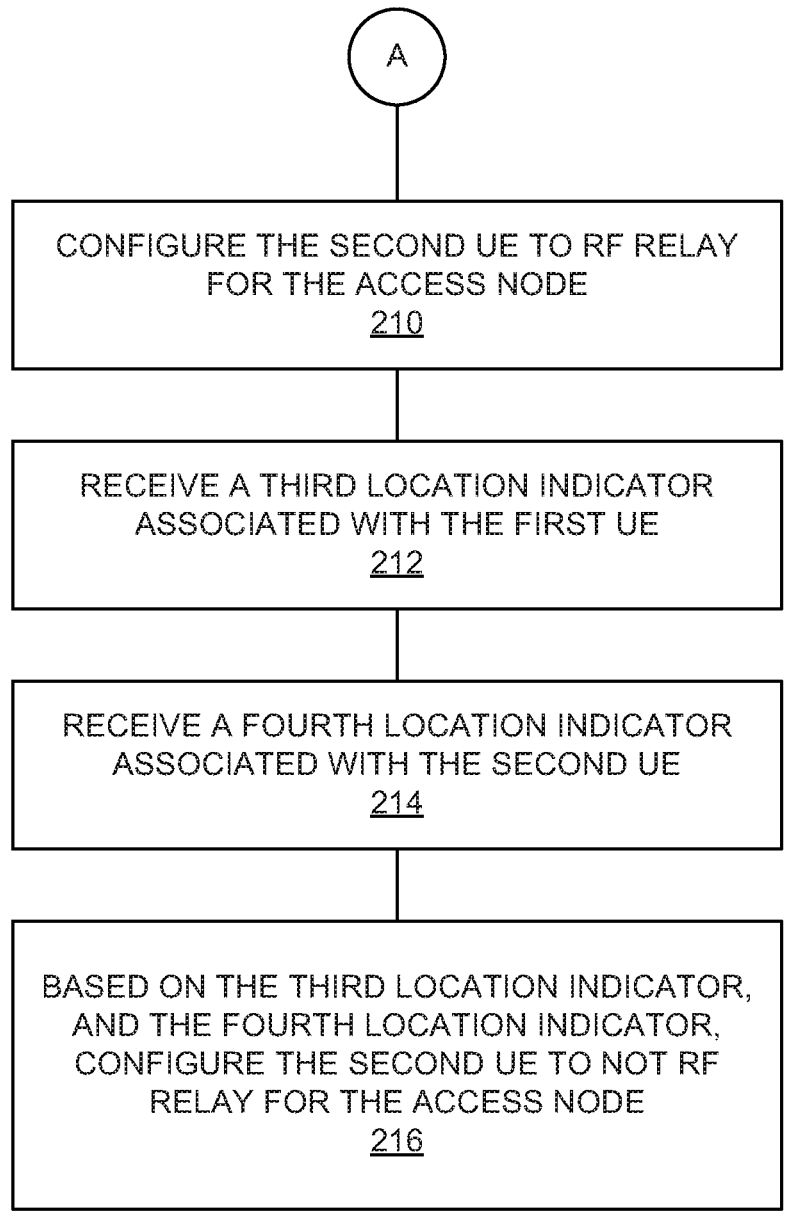

FIGS. 2A-2B are a flowchart illustrating a method of operating a communication system. The steps illustrated in FIGS. 2A-2B may be performed by one or more elements of communication system 100. An indicator of RF conditions associated with a first UE communicating with an access node is received (202). For example, access node 110 may receive an indicator of the RF conditions associated with the communication between wireless device 132 and access node 110. These indicators may include CQI, MCS, and/or HARQ statistics.

A first location indicator associated with a first UE is received (204). For example, access node 110 may receive (or determine) a location (e.g., GPS coordinates, grid-square, angle of arrival, etc.) associated with wireless device 132. A second location indicator associated with a second UE is received (206). For example, access node 110 may receive (or determine) a location (e.g., GPS coordinates, grid-square, angle of arrival, etc.) associated with wireless device 130.

Based on the indicator of RF conditions, the first location indicator, and the second location indicator, it is determined whether the second UE is to RF relay for the access node (208). For example, access node 110 may determine whether wireless device 130 is to RF relay for access node 110 based on whether wireless device 132 is experiencing poor RF conditions, and the location of wireless device 130 with respect to wireless device 132.

The second UE is configured to RF relay for the access node (210). For example, access node 110 may, based on the determination that wireless device 130 is to RF relay for access node 110, configure wireless device 130 to RF relay for access node 110. A third location indicator associated with the first UE is received (212). For example, after a period of time, wireless device 132 may change locations relative to wireless device 130 and/or access node 110. This new location may be received by access node 110. This new location may correspond to improved or degraded RF conditions for wireless device 132.

A fourth location indicator associated with the second UE is received (214). For example, after a period of time, wireless device 130 may change locations relative to wireless device 130 and/or access node 110. This new location may be received by access node 110. This new location may correspond to improved or degraded RF conditions for the communication between wireless device 132 and access node 110 (either direct communication or communication via RF relaying by wireless device 130.)

Based on the third location indicator and the fourth location indicator, the second UE is configured to not RF relay for the access node (216). For example, based on the locations of RF relaying wireless device 130 and wireless device 132, access node 110 may configure wireless device 130 to stop RF relaying. In particular, if wireless device 130 and wireless device 132 have moved far apart, access node 110 may configure wireless device 130 to stop RF relaying because the RF relay provided by wireless device 130 is unlikely to benefit the communication between wireless device 132 and access node 110.

Figure 3:
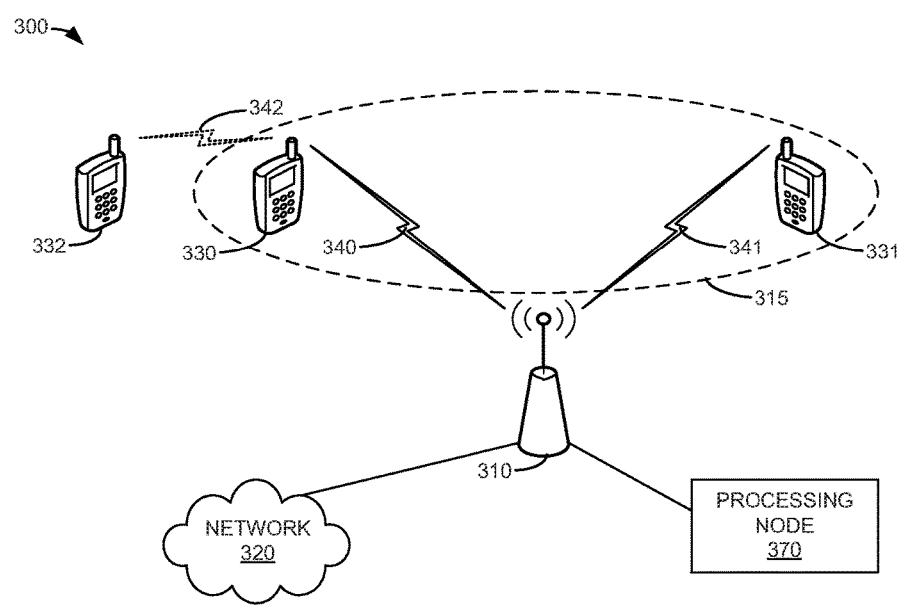
FIG. 3 is an illustration of a communication system with RF relay control.

FIG. 3 is an illustration of a communication system with RF relay control. In FIG. 3, communication system 300 comprises access node 310, network 320, wireless device 330, wireless device 331, and processing node 370. Network 320 is operatively coupled to access node 310. Processing node 370 is operatively couple to (or is a part of) access node 310. Wireless device 330 is operatively coupled to access node 310 via wireless link 340. Wireless device 331 is operatively coupled to access node 310 via wireless link 341. Wireless device 332 can, when wireless device 330 is functioning as an RF relay, be operatively coupled to access node 310 via wireless link 342, wireless device 330, and wireless link 340.

Wireless device 330 and wireless device 331 may be any device, system, combination of devices, or other such communication platform capable of communicating with access node 310. At least wireless device 330 is capable of functioning as a relay node for communication with access node 310. Wireless device 332 may be any device, system, combination of devices, or other such communication platform capable of communicating with access node 310 via wireless device 330 when wireless device 330 is configured as a relay on behalf of access node 310. Each of wireless devices 330-432 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 310 via wireless links. Other types of communication platforms are possible.

In an embodiment, wireless device 330 can be configured to function as a relay on behalf of access node 310. In an embodiment, wireless device 330 can be configured to function as a layer 1 (L1) relay. RF signals received from access node 310 are amplified and transmitted by the relaying device (i.e., wireless device 330 to the device being relayed (i.e., wireless device 332). Likewise, RF signals received from the device(s) being relayed (i.e., wireless device 332) are amplified and transmitted by the relaying device (i.e., wireless device 330) to access node 310.

Access node 310 may be any wireless system that can function as a donor access node and provide communication connectivity to network 320. Examples of access nodes that may be utilized include, base transceiver stations (BTSs), radio base stations (RBSs), Node B, enhanced Node B (eNBs) and others. Access nodes may include a number of elements known to those skilled in the art comprising a transceiver, power amplifier, combiner, duplexer, antenna and control function.

Network 320 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Network 320 may also comprise a wireless network, including base stations, wireless communication nodes, telephony switches, internet routers, network gateways, computer systems, communication links, or some other type of communication equipment, and combinations thereof. Wired network protocols that may be utilized by network 320 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 310 and network 320 which are omitted for clarity, including additional processing nodes, routers, gateways, and physical and/or wireless data links for carrying data among the various network elements.

In an embodiment, communication system 300 (and processing node 370, in particular) can control the on and off duration of the RF relay functionality provided by wireless device 330 and wireless device 331. When communication system 300 determines that at least one wireless device (e.g., wireless device 332) is in poor RF conditions, and also determines that another wireless device (e.g., wireless device 330 or wireless device 331) is proximate to the wireless device 332 that is experiencing poor RF conditions, communication system 300 configures wireless device 330 or wireless device 331, respectively, to act as an RF relay.

When communication system 300 determines that there are no wireless devices 332 experiencing poor RF conditions, or determines that there are no wireless devices 330-331 located proximate to a wireless device 332 that is experiencing poor RF conditions, communication system 300 configures wireless devices 330-331 to disable their respective RF relay function.

Communication system 300 receives one or more indicators of RF conditions associated with wireless device 332. These indicators allow communication system 300 to determine whether communication between access node 310 and wireless device 332 may benefit from RF relaying by wireless device 330 or wireless device 331. In other words, these indicators are used by communication system 300 as a basis for determining whether wireless device 332 is experiencing poor RF conditions.

Communication system 300 also receives (or determines) a first location associated with wireless device 332. Communication system 300 also receives (or determines) a second location associated with wireless device 330. These locations are used by communication system 300 as a basis for determining whether wireless device 332 could benefit from RF relaying by wireless device 330. In other words, if wireless device 330 is greater than a preselected distance from wireless device 332, enabling RF relaying by wireless device 330 is unlikely to improve the communication between wireless device 332 and access node 310.

If wireless device 330 is greater than a preselected distance from wireless device 332, communication system 300 does not enable RF relaying by wireless device 330. Likewise, if wireless device 331 is greater than a preselected distance from wireless device 332, communication system 300 does not enable RF relaying by wireless device 331. If wireless device 330 is less than a preselected distance from wireless device 332, communication system 300 configures wireless device 330 to RF relay. Likewise, if wireless device 331 is less than a preselected distance from wireless device 332, communication system 300 configures wireless device 331 to RF relay.

The distance between wireless device 330 and/or wireless device 331 and wireless device 332 may be expressed in terms of a linear distance. Thus, whether wireless device 332 could benefit from RF relaying by wireless device 330 and/or wireless device 331 can be determined in terms of the distance between wireless device 332 and a respective wireless device 330 and/or wireless device 331 meeting (or not meeting) a threshold criteria (e.g., the number of meters between a respective wireless device 330-331 being less than N meters—where N is a preselected number of meters.)

The locations of wireless devices 330-331 may be categorized into areas (e.g., grid-squares, curvilinear squares.) The distance between wireless device 332 and a respective wireless device 330-331 may be expressed in terms of whether or not a respective wireless device 330-331 and wireless device 332 are in the same area (e.g., both are located in the same grid-square.) Thus, whether wireless device 332 could benefit from RF relaying by a respective wireless device 330-331 can be determined in terms of a threshold criteria that is based on whether or not a respective wireless device 330-331 and wireless device 332 have been associated with the same area (e.g., grid-square) by communication system 300.

After configuring wireless device 330 to function as an RF relay, when wireless device 330 and wireless device 332 move apart from each other (e.g., meet a second threshold criteria for the distance between wireless device 330 and wireless device 332), communication system 300 reconfigures wireless device 330 to not function as an RF relay. In this manner, when the RF relay by wireless device 330 is no longer likely to be beneficial to communication between wireless device 332 and access node 310, the RF relay by wireless device 330 is stopped thereby eliminating interference caused by wireless device 330's RF relaying.

Communication system 300 can generate a first indicator of wireless network conditions associated with wireless devices 330-332. This first indicator of wireless network conditions may be based on, for example, an increase in: connection drop(s), connection establishment failure(s), connection reestablishment failure(s), handoff failures, and the like. Based on this first indicator of wireless network conditions, communication system 300 configures wireless device 330 to RF relay. This causes wireless device 330 to relay the repeating beacon transmissions coming from access node 310.

While wireless device 330 is relaying the repeating beacon transmissions coming from access node 310, communication system 300 can generate a second indicator of wireless network conditions. This second indicator is associated with wireless device 330 relaying the repeating beacon transmissions coming from access node 310. Based on this second indictor of network conditions, communication system 300 configures wireless device 330 to stop RF relaying and thereby no longer relay the repeating beacon transmissions from access node 310. In particular, if the second indicator does not show an improvement in the wireless networks conditions (which is likely to have been caused by configuring wireless device 330 to RF relay), then communication system 300 turns off RF relaying by wireless device 330—thereby eliminating interference caused by wireless device 330's RF relaying.

The second indictor of network conditions can be based on at least one wireless device 332 establishing a communication link with access node 310. The second indictor of network conditions can be based on at least one wireless device 332 establishing a communication link with access node 310 via wireless device 330's RF relay.

Communication system 300 can generate a first indicator of air-interface conditions associated with wireless devices 330-332 communicating via access node 310. Based on this first indicator of air-interface conditions, wireless device 330 is configured to RF relay for access node 310. When a wireless device 330 is configured to RF relay for access node 310, the wireless device 330 will relay the repeating beacon transmissions from access node 310. After wireless device 330 relays RF signals for access node 310 for a period of time, communication system 300 can generate a second indicator of air-interface conditions that is associated with wireless device 330 RF relaying for access node 310. In particular, this second indicator can indicate whether the air-interface conditions (e.g., CQI reports, MCS, HARQ statistics/counts, connection drops, connection establishment, connection reestablishment, handoff success, etc.) improved while wireless device 330 was RF relaying as compared to when wireless device 330 was not RF relaying.

Based on this second indicator, communication system 300 may configure wireless device 330 to stop RF relaying. In particular, based on the second indicator corresponding to degraded (or at least not improved) network and/or air-interface conditions while wireless device 330 was RF relaying, access node 330 can determine that configuring wireless device 330 as an RF relay either does not improve the air-interface conditions, or degrades the air-interface conditions.

Also based on this second indicator, communication system 300 may select another wireless device (e.g., wireless device 331) to be configured to RF relay for access node 310. In other words, if configuring wireless device 330 as an RF relay does not improve the network and/or air-interface conditions, communication system 300 can successively select (one or more) wireless devices 330-331 to try as RF relays for access node 310. If configuring the selected wireless device 330-331 does not improve the air-interface conditions, then the wireless devices 330-331 are stopped from RF relaying (at least for a while). If configuring a selected wireless device 330-331 (or plurality of wireless devices) to RF relay for access node 310 improves network and/or air-interface conditions, then communication system 300 may elect to have the selected wireless device(s) 330-331 continue to RF relay for access node 310.

Communication system 300 may also make the decision of whether to have a particular wireless device 330-331 (or group of wireless devices) continue to RF relay based on the location of the respective wireless devices 330-332. This decision may be further based on the location of a wireless device 330-331 that establishes a connection to access node 310. In particular, the decision of whether to have a wireless device (e.g., wireless device 330) continue to RF relay may be further based on the location of a wireless device (e.g., wireless device 332) that establishes a new connection to access node 310.

For example, if wireless device 332 establishes communication with access node 310 (an indicator of improved air-interface and/or network conditions) while wireless device 330 is RF relaying, communication system 300 compares the locations (or location indicators) of wireless device 330 and wireless device 332. If the distance between wireless device 330 and wireless device 331 meets a threshold criteria (e.g., is less than a predetermined distance, or both devices are within the same area/grid-square), then communication system 300 can conclude that the RF relay provided by wireless device 330 may have caused the improved air-interface and/or network conditions indicator. Based on the locations of the wireless device 330 configured to RF relay, and the wireless device 332 that establishes communication with access node 310, communication system 300 can determine that wireless device 330 should continue to RF relay for access node 310.

In another example, if wireless device 332 establishes communication with access node 310 (an indicator of improved air-interface and/or network conditions) while wireless device 331 is RF relaying, communication system 300 compares the locations (or location indicators) of wireless device 331 and wireless device 332. If the distance between wireless device 331 and wireless device 332 meets a threshold criteria (e.g., is greater than a predetermined distance, or both devices are not within the same area/grid-square), then communication system 300 can conclude that the RF relay provided by wireless device 331 was not the cause of the improved air-interface conditions indicator. Therefore, based on the locations of the wireless device 331 configured to RF relay, and the wireless device 332 that establishes communication with access node 310, communication system 300 can determine that wireless device 331 should not continue to RF relay for access node 310.

Communication system 300 may select wireless device 330 to RF relay for access node 310. After selecting wireless device 330, communication system 300 may configure wireless device 330 to RF relay thereby relaying the repeating beacon transmissions of access node 310.

While wireless device 330 is relaying for access node 310, wireless device 332 may establish a new connection to access node 310. Communication system 300 can determine whether the new connection between access node 310 and wireless device 332 occurred during the time wireless device 330 was RF relaying for access node 310. Communication system 300 can also determine whether the connection between access node 310 and wireless device 332 is as a result of wireless device 330 relaying for access node 310. In the event that wireless device 332 did not establish the new connection to access node 310 as a result of the RF relay provided by wireless device 330, communication system 300 configures wireless device 330 to not relay for access node 310 (and thereby not relay the repeating beacon transmissions from access node 310.)

To determine whether wireless device 332 established the connection to access node 310 as a result of the RF relay provided by wireless device 330, communication system 300 may receive (or determine) location indicators associated with wireless device 330 and wireless device 332. Based on whether these location indicators meet a threshold criteria (e.g., a criteria related to the proximity of wireless device 330 and wireless device 332 to each other), communication system 300 determines whether wireless device 332 established the new connection to access node 310 as a result of the RF relay provided by wireless device 330. For example, if these location indicators correspond to wireless device 330 and wireless device 332 being in relatively close proximity to each other (e.g., within the same grid-square, or within a specified distance of each other), then communication system 300 can conclude that wireless device 332 established the connection to access node 310 as a result of the RF relay provided by wireless device 330. If these location indicators correspond to wireless device 330 and wireless device 332 being relatively far apart from each other (e.g., not within the same grid-square, or not within a specified distance of each other), then communication system 300 can conclude that wireless device 332 did not establish the connection to access node 310 as a result of the RF relay provided by wireless device 330.

Figure 4A:
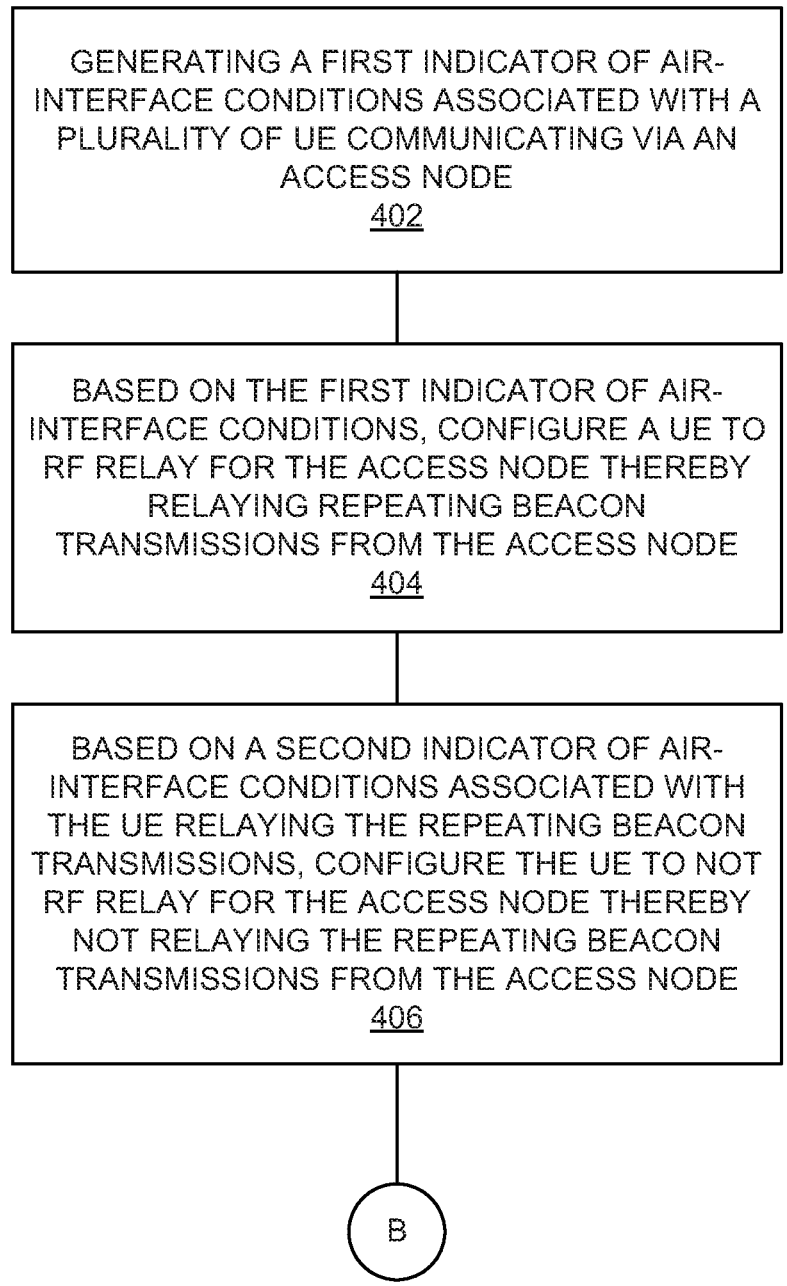
FIGS. 4A-4B are a flowchart illustrating a method of controlling RF relay by user equipment (UE) devices.
Figure 4B:
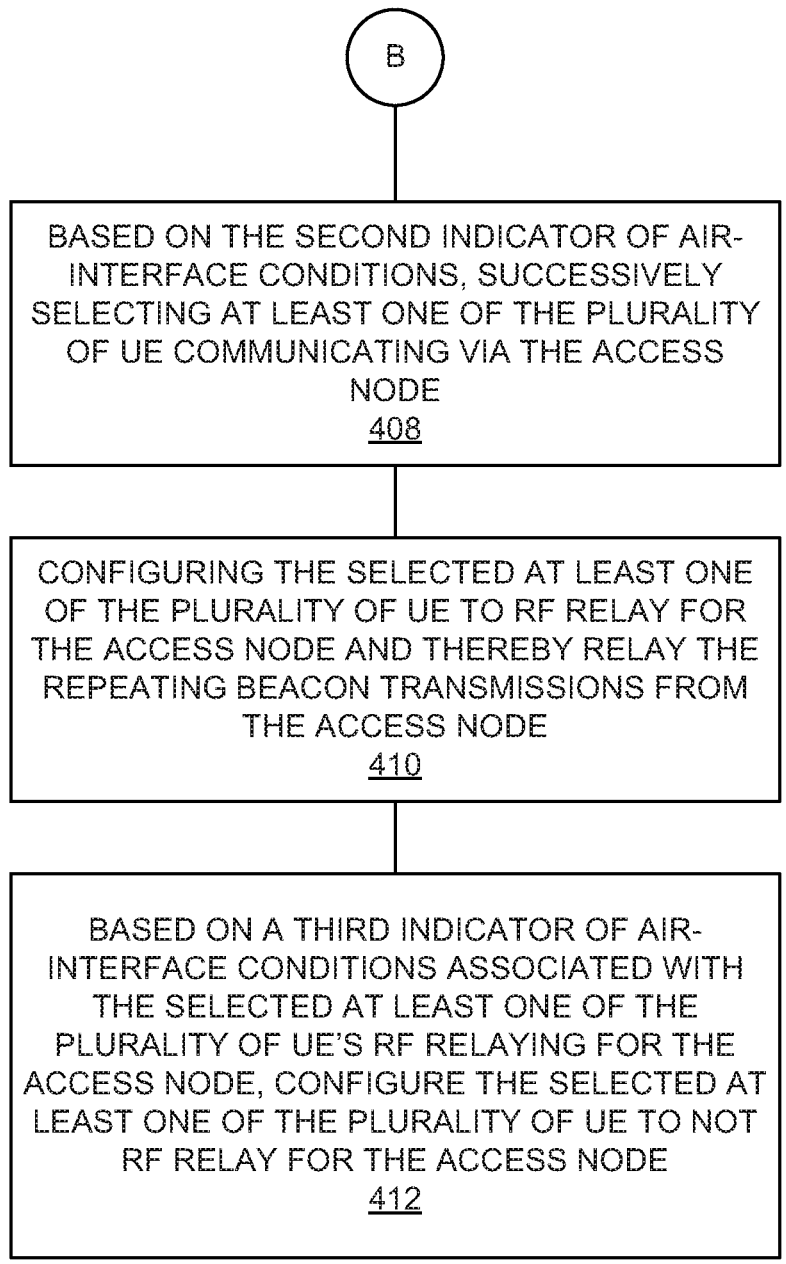

FIGS. 4A-4B are a flowchart illustrating a method of controlling RF relay by user equipment (UE) devices. The steps illustrated in FIGS. 4A-4B may be performed by one or more elements of communication system 100 and/or communication system 300. A first indicator of air-interface conditions associated with a plurality of UE communicating via an access node is generated (402). For example, communication system 300 may generate an indicator of air-interface and/or network conditions associated with wireless devices 330-331 communicating via access node 310.

Based on the first indicator of air-interface conditions, a UE is configured to RF relay for the access node thereby relaying repeating beacon transmissions from the access node (404). For example, based on an indicator of air-interface and/or network conditions, communication system 300 may configure wireless device 330 to relay for access node 310—thereby relaying the beacon transmissions from access node 310.

Based on a second indicator of air-interface conditions associated with the UE relaying the repeating beacon transmissions, the UE is configured to not RF relay for the access node thereby not relaying the repeating beacon transmissions from the access node (406). For example, based on an indicator that wireless device 332 did (or does) not establish a new connection to access node 310 while wireless device 330 is functioning as an RF relay for access node 310, communication system 300 may configure wireless device 330 to stop relaying for access node 310.

Based on the second indictor of air-interface conditions, successively selecting at least one of the plurality of UE communicating via the access node (408). For example, based on based on an indicator that wireless device 332 did (or does) not establish a new connection to access node 310 while wireless device 330 is functioning as an RF relay for access node 310, communication system 300 may successively select other wireless devices (e.g., wireless device 331) that are communicating via access node 310 to try as RF relays.

The selected at least one of the plurality of UE are configured to RF relay for the access node and thereby relay the repeating beacon transmissions from the access node (410). For example, communication system 300 may successively try other wireless devices (e.g., wireless device 331) as RF relays to determine whether the other wireless devices functioning as relays improves (or degrades) air-interface and/or network conditions.

Based on a third indicator of air-interface conditions associated with the selected at least one of the plurality of UEs RF relaying for the access node, the selected at least one of the plurality of UE to not RF relay for the access node (412). For example, as communication system 300 successively tries wireless devices (e.g., wireless device 330-331) as RF relays to determine whether the other wireless devices 330-331 functioning as relays improves (or degrades) air-interface and/or network conditions, communication system 300, configures those wireless devices 330-331 that do not improve air-interface and/or network conditions to not function as RF relays (at least for a period of time.)

Figure 5A:
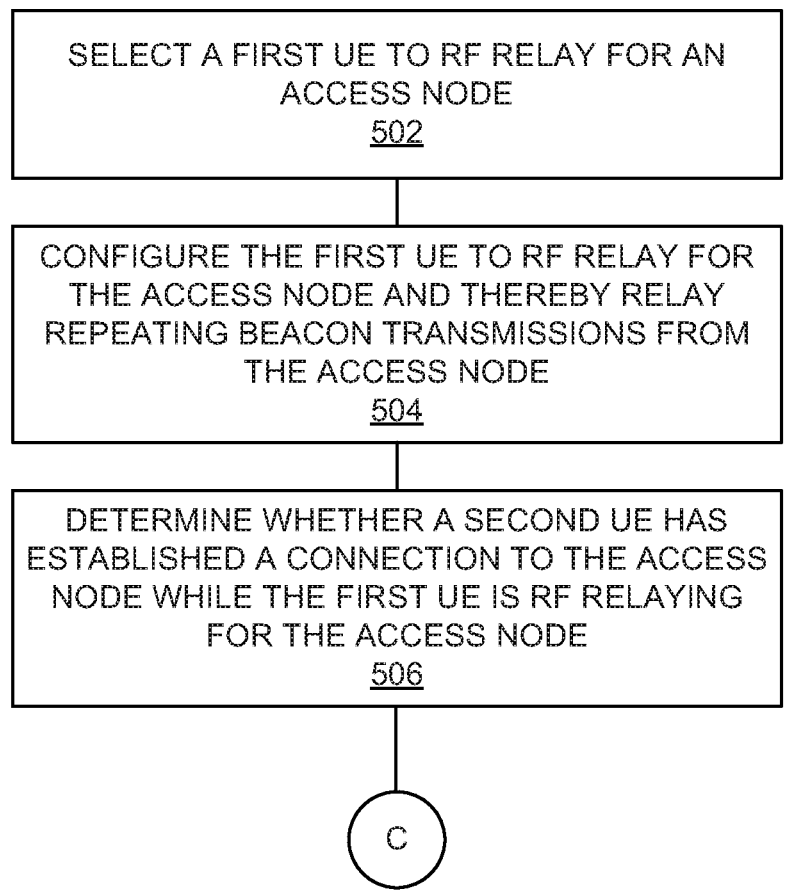
FIGS. 5A-5B are a flowchart illustrating RF relay control.
Figure 5B:
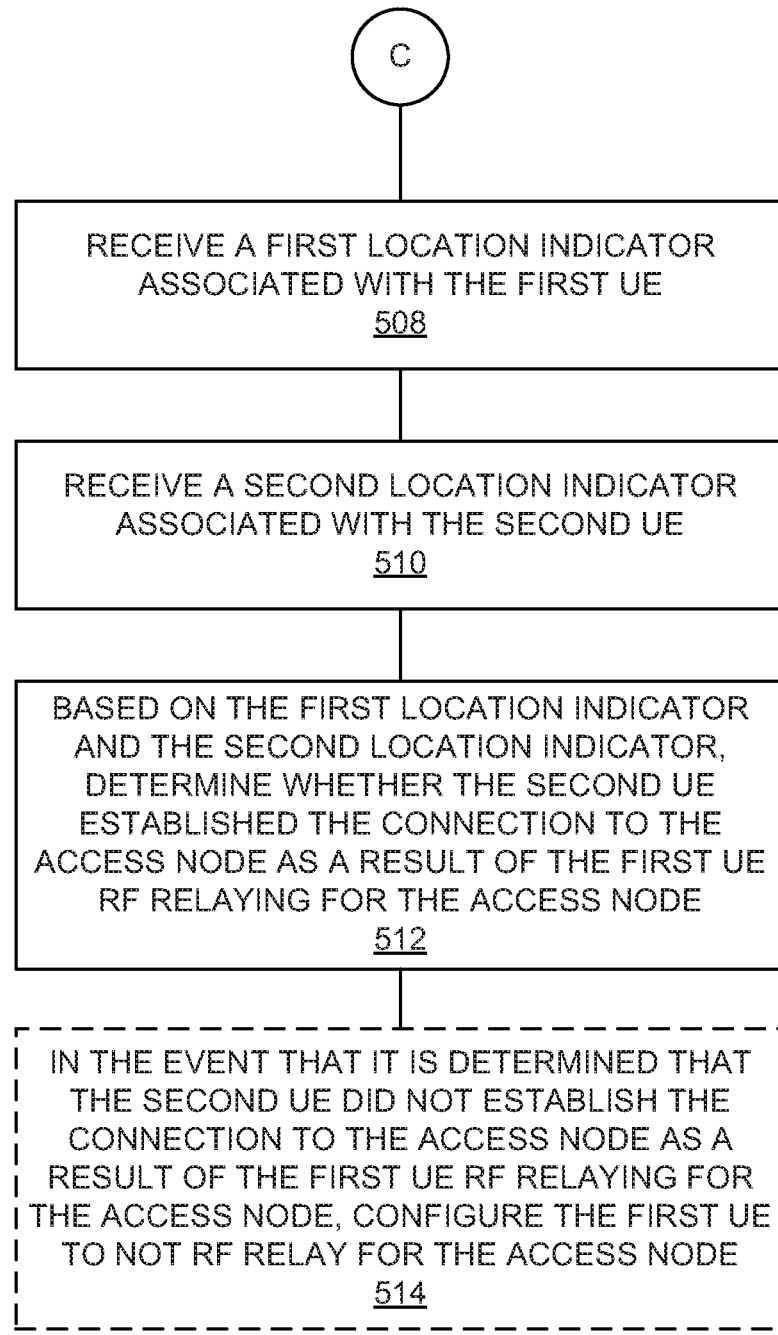

FIGS. 5A-5B are a flowchart illustrating RF relay control. The steps illustrated in FIGS. 5A-5B may be performed by one or more elements of communication system 100 and/or communication system 300. A first UE is selected to RF relay for an access node (502). For example, communication system 300 may select wireless device 330 to function as an RF relay for access node 310.

The first UE is configured to RF relay for the access node and thereby relay repeating beacon transmissions from the access node (504). For example, communication system 300 may configure wireless device 330 to RF relay for access node 310 and thereby relay beacon (discovery) transmissions from access node 310 to wireless device 332 via wireless link 342.

It is determined whether a second UE has established a connection to the access node while the first UE is RF relaying for the access node (506). For example, by examining the connections to access node 310 while wireless device 330 is functioning communication system 300 can determine whether wireless device 332 establishes a connection to access node 310 during the period of time wireless device 330 functioned (or is functioning) as an RF relay for access node 310.

A first location indicator associated with the first UE is received (508). For example, communication system 300 can determine a location associated with wireless device 330. A second location indicator associated with the second UE is received (510). For example, after wireless device 332 has connected to access node 310, communication system 300 can determine a location associated with wireless device 332.

Based on the first location indicator and the second location indicator, it is determined whether the second UE establish the connection to the access node as a result of the first UE RF relaying for the access node (512). For example, based on the relative locations (e.g., proximity) of wireless device 332 and wireless device 330, communication system 300 determines whether wireless device 332 established its connection with access node 310 as a result of the RF relay provided by wireless device 330.

In the event that it is determined that the second UE did not establish the connection to the access node as a result of the first UE RF relaying for the access node, the first UE is configured to not RF relay for the access node (514). For example, if wireless device 332 and wireless device 330 are not within a threshold criteria distance of each other, then communication system 300 determines that the connection established by wireless device 332 is not the result of RF relaying (e.g., of the beacon transmissions) by wireless device 330. In this instance, communication system 300 turns of RF relaying by wireless device 330 (thereby reducing interference.)

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 and/or communication system 300 may be, comprise, or include computers systems and/or processing nodes. This includes, but is not limited to: access node 110, wireless devices 130-133, access node 310, wireless devices 330-332, processing node 370, and/or network 320.

Figure 6:
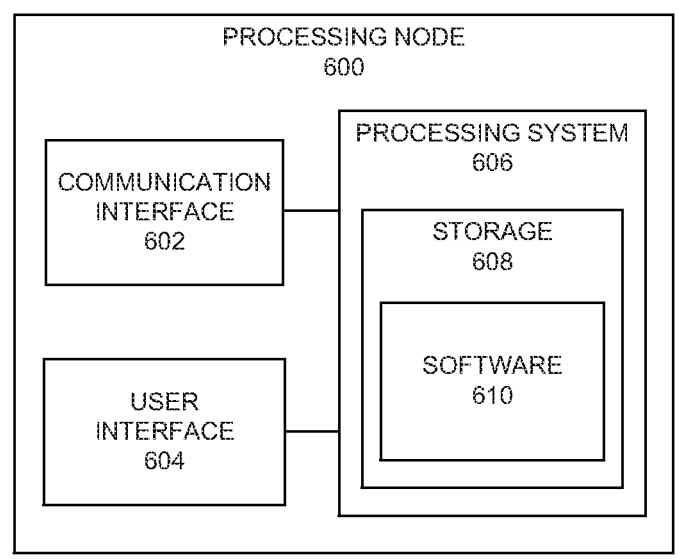
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes processing node 370. Processing node 600 can also be an adjunct or component of a network element, such as an element of access node 110, wireless devices 130-133, access node 310, wireless devices 330-332, network 320, a mobility management entity, a gateway, a proxy node, or another network element in a communication system. The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    receiving an indicator of RF conditions associated with a first user equipment (UE) communicating with an access node;
    receiving a first location indicator associated with the first UE;
    receiving a second location indicator associated with a second UE;
    based on the indicator of RF conditions, the first location indicator, and the second location indicator, enabling the second UE to RF relay for the first UE to communicate with the access node;
    after a period of time after enabling the second UE to RF relay for the first UE, and while the second UE is RF relaying for the first UE, generating an indicator of network conditions;
    determining whether the network conditions are improved based on the indicator of network conditions;
    when the network conditions are improved, determining a distance between the first UE and the second UE; and
    when the distance is greater than a predetermined distance, disabling the second UE as an RF relay.

2. The method of claim 1, wherein enabling the second UE to RF relay for the first UE to communicate with the access node is based on the first location indicator and the second location indicator meeting a first threshold criteria.

3. The method of claim 2, wherein the first threshold criteria is based on a distance indicator of a distance between a first location indicated by the first location indicator and a second location indicated by the second location indicator.

4. The method of claim 2, further comprising:
    receiving a third location indicator associated with the first UE;
    receiving a fourth location indicator associated with a second UE; and
    in the event of the third location indicator and the fourth location indicator meeting a second threshold criteria, reconfiguring the second UE to not RF relay.

5. A method of operating a communication system, comprising:
    generating a first indicator of air-interface conditions associated with a plurality of user equipment (UE) communicating via an access node;
    based on the first indicator of air-interface conditions, configuring a first UE to RF relay for the access node and thereby relay repeating beacon transmissions from the access node;
    while the first UE is providing RF relay to the access node, generating a second indicator of air-interface conditions associated with the RF relay provided by the first UE for the access node;
    determining whether the air-interface conditions are improved by comparing the second indicator with the first indicator;
    when the air-interface conditions are improved, determining a distance between the first UE and one of the plurality of UE that established a connection with the access node while the first UE is providing RF relay; and
    when the distance is greater than a predetermined distance, configuring the first UE not to provide RF relay for the access node.

6. The method of claim 5, wherein the first indicator of air-interface conditions and the second indicator of air-interface conditions are based on a quality indicator associated with at least one of the plurality of user equipment (UE) communicating via the access node.

7. The method of claim 6, wherein the quality indicator corresponds to a modulation and coding scheme (MCS) being used to communicate with at least one of the plurality of UE communicating via the access node.

8. The method of claim 6, wherein the quality indicator is based on a channel quality indicator (CQI) reported by at least one of the plurality of UE communicating via the access node.

9. The method of claim 5, further comprising:
    when comparing the second indicator and the first indicator does not indicate an improvement in the air-interface conditions, successively selecting at least one of the plurality of UE communicating via the access node;
    configuring the selected at least one of the plurality of UE to RF relay for the access node and thereby the relay repeating beacon transmissions from the access node; and
    based on a third indicator of air-interface conditions associated with the selected at least one of the plurality of UE providing RF relay for the access node and thereby relaying the repeating beacon transmissions, configuring the selected at least one of the plurality of UE not to RF relay for the access node.

10. The method of claim 5, when the distance is smaller than or equal to the predetermined distance, configuring the first UE to continue providing RF relay for the access node.

11. A method of operating a communication system, comprising:
- selecting a first user equipment (UE) to RF relay for an access node;
- configuring the first UE to RF relay for the access node and thereby relay repeating beacon transmissions from the access node;
- determining that a second UE has established a connection to the access node through the first UE while the first UE is RF relaying for the access node; and
- after a period of time after determining that the second UE has established the connection to the access node through the first UE, and while the first UE is RF relaying for the second UE, generating an indicator of network conditions;
- determining whether the network conditions are improved based on the indicator of the network conditions;
- when the network conditions are improved, determining a distance between the first UE and the second UE; and
- when the distance between the first UE and the second UE is greater than a predetermined distance, disabling the first UE as an RF relay for the access node.

12. The method of claim 11, further comprising:
- receiving a first location indicator associated with the first UE; and,
- receiving a second location indicator associated with a second UE.

13. The method of claim 12, wherein the distance between the first UE and the second UE is determined based on the first location indicator and the second location indicator.

14. The method of claim 11, further comprising:
- successively selecting at least one of a plurality of UE communicating via the access node to RF relay for the access node;
- enabling the selected at least one of the plurality of UE to RF relay for the access node; and
- determining for a respective one of the selected at least one of the plurality of UE whether the second UE established the connection to the access node as a result of the respective one of the selected at least one of the plurality of UE RF relaying for the access node.

* * * * *